United States Patent
Kato

(10) Patent No.: US 7,159,980 B2
(45) Date of Patent: Jan. 9, 2007

(54) PROGRESSIVE REFRACTIVE POWER LENS AND PRODUCTION METHOD THEREFOR

(75) Inventor: Kazutoshi Kato, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/509,494

(22) PCT Filed: Mar. 30, 2004

(86) PCT No.: PCT/JP2004/004557

§ 371 (c)(1),
(2), (4) Date: Sep. 29, 2004

(87) PCT Pub. No.: WO2004/090614

PCT Pub. Date: Oct. 21, 2004

(65) Prior Publication Data

US 2005/0146681 A1    Jul. 7, 2005

(30) Foreign Application Priority Data

Apr. 10, 2003    (JP) .............................. 2003-106600

(51) Int. Cl.
G02C 7/06    (2006.01)
(52) U.S. Cl. ...................................... 351/168; 351/161
(58) Field of Classification Search ................ 351/159, 351/160, 161, 164, 168, 169, 171
See application file for complete search history.

(56) References Cited

U.S. PATENT DOCUMENTS

| | | | |
|---|---|---|---|
| 6,505,934 B1 * | 1/2003 | Menezes ...................... | 351/169 |
| 6,712,467 B1 * | 3/2004 | Kitani ......................... | 351/169 |
| 6,789,898 B1 * | 9/2004 | Le Saux et al. ............. | 351/159 |
| 6,935,744 B1 * | 8/2005 | Kitani et al. ................ | 351/169 |
| 2002/0075446 A1 * | 6/2002 | Lossman et al. ............ | 351/159 |
| 2002/0101565 A1 * | 8/2002 | Yamaguchi ................. | 351/169 |
| 2003/0231282 A1 * | 12/2003 | Saux et al. .................. | 351/168 |

FOREIGN PATENT DOCUMENTS

| WO | WO 97/019382 A | 5/1997 |
|---|---|---|
| WO | WO 97/19383 A | 5/1997 |

* cited by examiner

Primary Examiner—Scott J. Sugarman
Assistant Examiner—Darryl J. Collins
(74) Attorney, Agent, or Firm—Sughrue Mion, PLLC

(57) ABSTRACT

A progressive power lens is conventionally so designed that a distance portion and a near portion are linked together in a successive manner, and thus framing cannot be done in a manner as to fully achieve the best optical properties of the near portion. The present invention provides, on the other hand, a progressive power lens that is designed to make the near portion closer to an eyeball without impairing the optical properties of the progressive power lens. Accordingly, both the distance portion and the near portion can be framed with the ideal fitting, and the resulting eyeglasses can be less in distortion and fluctuation.

15 Claims, 12 Drawing Sheets

F I G. 9
OBJECT-SIDE
REFRACTING SURFACE
EYEBALL-SIDE
REFRACTING SURFACE
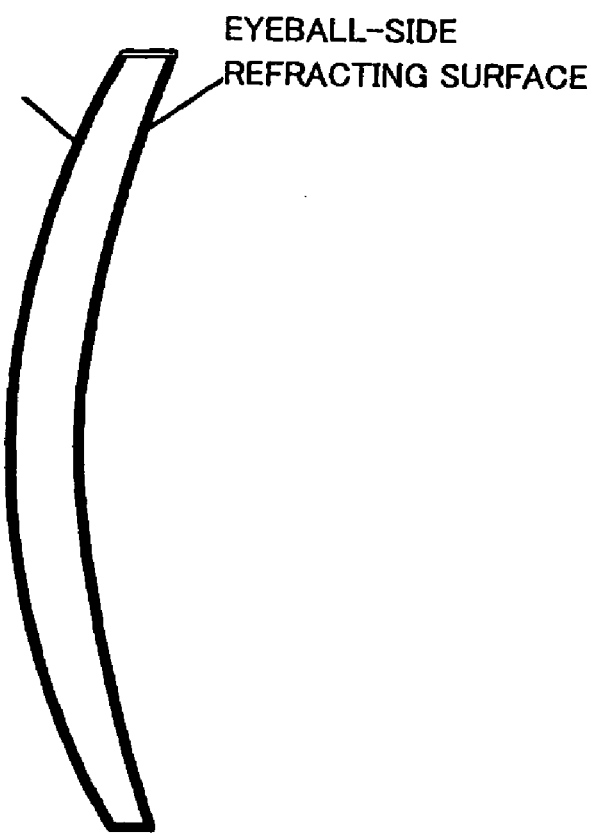

PROGRESSIVE REFRACTIVE POWER LENS AND PRODUCTION METHOD THEREFOR

TECHNICAL FIELD

The present invention relates to a progressive power lens that is used as an eyesight-corrective spectacle lens for coping with presbyopia due to reduced eyeball control power.

BACKGROUND ART

First of all, referring to FIG. 8, described is the basic structure of a progressive power lens. The progressive power lens is provided with a distance portion having power to see far away, a near portion having power to see near objects, and locating therebetween, an intermediate portion having power showing a progressive change. The power difference between the distance portion and the near portion is referred to as addition power, and any value considered appropriate is set thereto in consideration of a lens wearer's decreasing level of control power. The portions toward the side of the intermediate portion and the near portion are referred to as aberration portion, not suitable for optical use. This is an inevitable drawback of a progressive power lens, needing to smoothly neutralize the power difference between the distance portion and the near portion. Further, as shown in FIG. 9, a spectacle lens is structured by an object-side refracting surface and an eyeball-side refracting surface. Generally, a progressive power lens is designated with, by lens manufacturers, a spot for measuring power for distance viewing and that for near viewing. As shown in FIG. 10, generally, those are explicitly printed on a lens refracting surface, for example. Even if not printed, a permanent mark provided to the lens may help to find such measurement spots by following the lens manufacturers' specifications. The spot for measuring power for distance viewing is referred to as distance reference point, and the spot for measuring power for near viewing is referred to as near reference point. Here, the refracting surface, i.e., so-called progressive surface, generating addition power unique to progressive power is often an object-side refracting surface as shown in FIG. 11. If this is the case, the eyeball-side refracting surface is formed by a toric surface, for example, that is directed to the direction of a spherical surface or a cylinder axis in accordance with a lens wearers' prescribed dioptric power. In this Specification, such a progressive power lens is referred to as external progressive power lens. In the external progressive power lens, a refracting surface is provided on the object side for causing a change of the image magnification. Thus, this results in larger image distortion, and some people wearing a progressive power lens for the first time, and some people wearing a progressive power lens as a replacement with another of a different design may feel something is wrong. To prevent distortion generation resulting from such image magnification change, recently commercialized is an internal progressive power lens in which a progressive surface is placed on the eyeball side, details of which are found in WO97/19382 (FIGS. 4, 10, and 15). In such an internal progressive power lens, as shown in FIG. 12, an object-side refracting surface is a spherical surface or an aspherical surface symmetrical to a rotation axis, and an eyeball-side refracting surface is a complex curved surface as a combination result of a progressive surface, a toric surface, and a corrective aspherical surface component for correction of lens off-axis aberration. Further, as described in WO97/19383 (FIG. 1), also commercialized is a double-sided progressive power lens for sharing, for formation, between an object-side refracting surface and an eyeball-side refracting surface, an addition power component of a progressive surface. In such a double-sided addition lens, a progressive surface component causing the magnification change is partially observed on the object-side refracting surface. Thus, compared with the internal progressive power lens having the spherical object-side refracting surface, it is disadvantageous in terms of distortion. Surely, the distortion level can be better to a greater degree than the external progressive power lens. In these progressive power lenses, a distance portion and a near portion are formed to be a piece. As a result, if framing and wearing fit testing are done in such a manner as to provide the best optical properties for the distance portion, this inevitably defines the near portion by position. As a result, problematically, the fitting test optimum for near viewing cannot be independently performed. For example, to determine the dioptric power for distance use, as shown in FIG. 6, an ophthalmoscopic lens is set ahead of a cornea by about 12 mm to select the dioptric power for the lens to derive any predetermined eyesight. To determine the dioptric power for near use, as shown in FIG. 7, although a viewing object is different in position, an ophthalmoscopic lens is set ahead of the eye by about 12 mm similarly to the dioptric power for distance use to select the dioptric power. In this manner, the dioprtic power is determined under the condition that the optical axis of the ophthalmoscopic lens is in almost the same direction as the line of sight. The issue here is that, assuming if, for wearing, a progressive power lens made with the dioptric power for distance use and the dioptric power for near use determined as such, as shown in FIG. 4, when the optical axis of the lens is directed in the same direction as the line of sight in the distance portion, and when a lens is placed ahead of the eye by about 12 mm, the line of sight in the near portion is generally directed in a slanting direction, and the distance from the eye will be generally longer than 12 mm. Therefore, the dioptric power for near use actually working on the eye becomes different from the dioptric power of the lens. In recent years, such a difference is set with consideration given in advance prior to correcting the dioptric power. Even if so, it is difficult to say that correction is applied sufficiently because the dioptric power requires widely varying corrections in consideration of the wearer's dioptric power, the direction of the cylinder axis, and others. Moreover, when the near portion has a distance from the eyeball, the image magnification of the lens is increased, thereby increasing the image size difference between the distance portion and the near portion. As a result, phenomena such as image distortion and fluctuation unique to progressive power lenses are enhanced, and sometimes resulting in customer complaints as not comfortable to wear. To avoid such complaints, at eyeglasses shops, the lens may be leaned forward to a greater angle as shown in FIG. 5 for lens framing in such a manner that the near portion comes closer to the eyeball. If this is the case, however, the optical axis in the distance portion may not be directed in the same direction as the line of sight, whereby the optical properties originally aimed by the lens designer cannot be problematically fully achieved. Especially with the progressive lens of such a recent type, as described in the foregoing, that correction is applied in advance to the dioptric power in consideration of the dioptric power when the lens is actually worn, even a slight difference in direction between the optical axis and the line of sight causes the optical properties to be considerably degraded.

DISCLOSURE OF THE INVENTION

To solve above problems, there needs to provide a lens of a design in which a near portion comes closer to an eyeball after a distance portion is fit ideally. For the purpose, a progressive power lens of the present invention is directed to a progressive power lens structured by two refracting surfaces of an object-side refracting surface and an eyeball-side refracting surface. The progressive power lens is provided with a distance portion mainly for viewing objects in a distance range, a near portion mainly for viewing objects in a close range, and an intermediate portion mainly for viewing objects in an intermediate range in which a successive change is observed for power from the distance portion to the near portion. To the distance range, a distance reference point is set, and to the near portion, a near reference point is set. Such a progressive power lens is characterized in that, when the lens has presumably a reference spherical surface in its entirety that is defined by an average curvature of the eyeball-side refracting surface in the vicinity of the distance reference point, the eyeball-side refracting surface in the vicinity of the near reference point is located closer to the eyeball-side than the reference spherical surface in the vicinity of the near reference point. Further, the present invention is also directed to a progressive power lens structured by two refracting surfaces of an object-side refracting surface and an eyeball-side refracting surface. The progressive power lens is also provided with a distance portion mainly for viewing objects in a distance range, a near portion mainly for viewing objects in a close range, and an intermediate portion mainly for viewing objects in an intermediate range in which a successive change is observed for power from the distance portion to the near portion. To the distance portion, a distance reference point is set, and to the near portion, a near reference point is set. Such a progressive power lens is characterized in that a curvature along an intersection line defined by the eyeball-side refracting surface and a surface of section being vertical to the eyeball-side refracting surface and passing both the distance reference point and the near reference point shows an increase in the portion entirely covering the distance reference point and the near reference point, or the portion partially covering the same. The present invention is also directed to a progressive power lens structured by two refracting surfaces of an object-side refracting surface and an eyeball-side refracting surface. The progressive power lens is provided with a distance portion mainly for viewing objects in a distance range, a near portion mainly for viewing objects in a close range, and an intermediate portion mainly for viewing objects in an intermediate range in which a successive change is observed for power from the distance portion to the near portion. To the distance portion, a distance reference point is set, and to the near portion, a near reference point is set. Such a progressive power lens is characterized in that, when the lens has presumably a reference spherical surface in its entirety that is defined by an average curvature of the eyeball-side refracting surface in the vicinity of the distance reference point, an absolute value of a vertical component of a normal vector of the eyeball-side refracting surface at the near reference point is larger than an absolute value of a vertical component of a normal vector of the reference spherical surface at the near reference point. Further, characteristically, in a pair of right and left lenses, the eyeball-side refracting surface is in the same shape even if the power and addition power vary between right and left distance portions. As a method for manufacturing such progressive power lenses of the present invention at a low cost, characteristically, a progressive power lens whose eyeball-side refracting surface is aspherical surface, a toroidal surface, an aspherical surface symmetric to a rotation axis, or a progressive surface is manufactured through distortion of lens shape but not through change in thickness. Further, characteristically, a progressive power lens whose object-side refracting surface is a spherical surface, an aspherical surface symmetric to a rotation axis, or a progressive surface is manufactured through distortion of lens shape but not through change in thickness so that the progressive power lens described in any one of claims 1 to 4 is manufactured.

INDUSTRIAL APPLICABILITY

The present invention relates to a method for manufacturing lenses for eyeglasses and, specifically, is applicable but not restrictive to a method for manufacturing progressive power lenses.

BRIEF DESCRIPTION OF THE DRAWINGS

FIG. 9 is a cross-section view of a lens for eyeglasses.

BEST MODE FOR CARRYING OUT THE INVENTION

Figure 1:
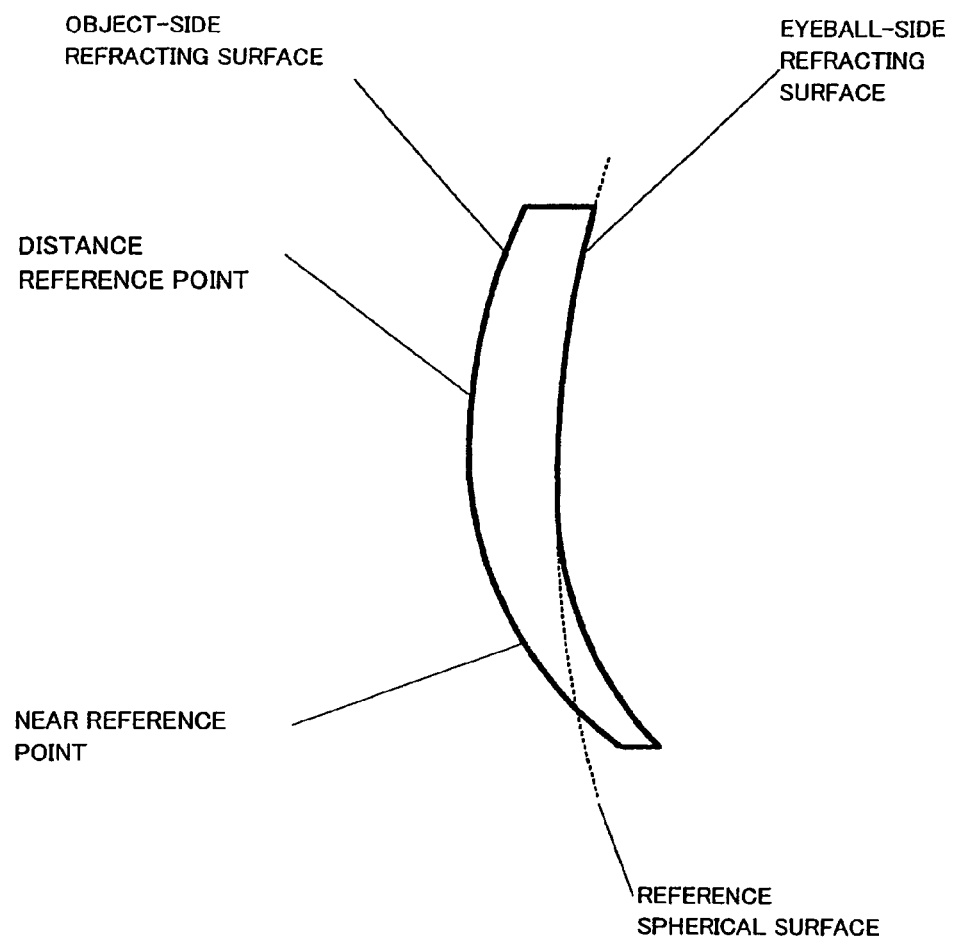
FIG. 1 is a cross-section view of a progressive power lens of the present invention.
Figure 2:
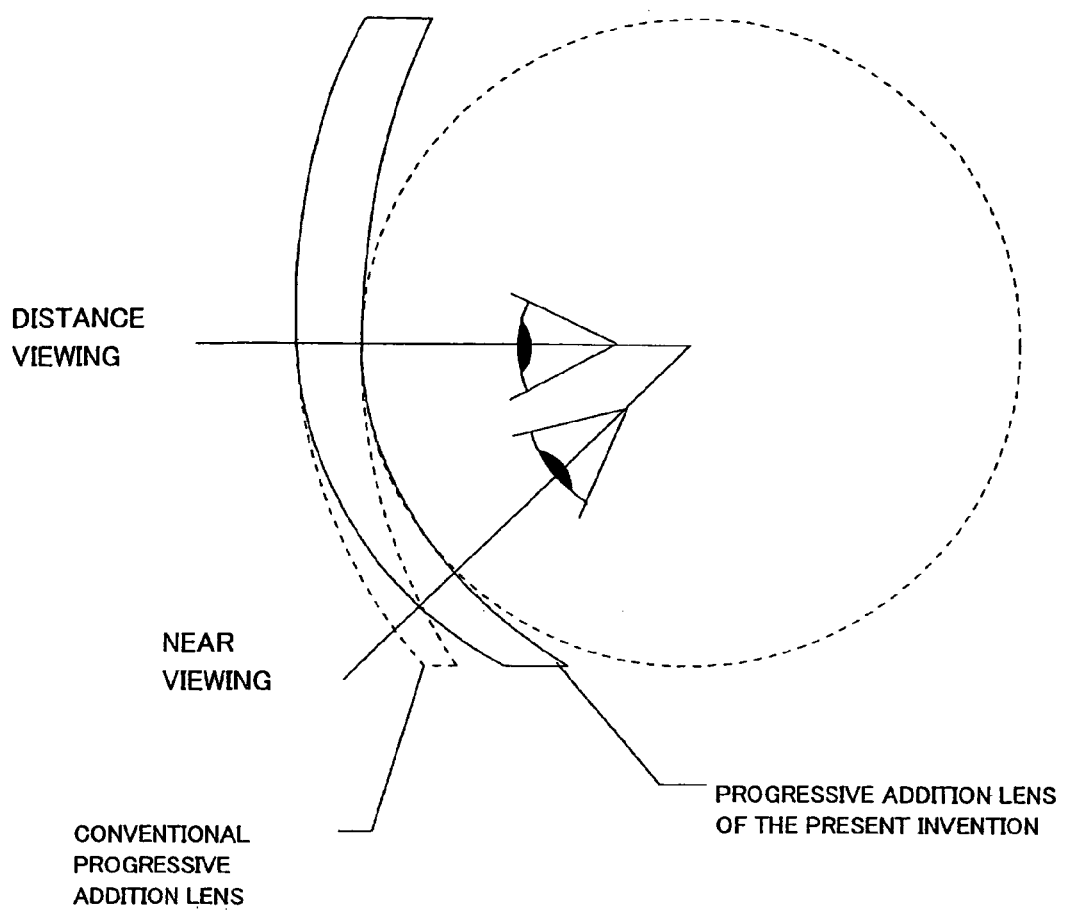
FIG. 2 is a conceptual diagram showing the effects of the progressive power lens of the present invention.
Figure 3:
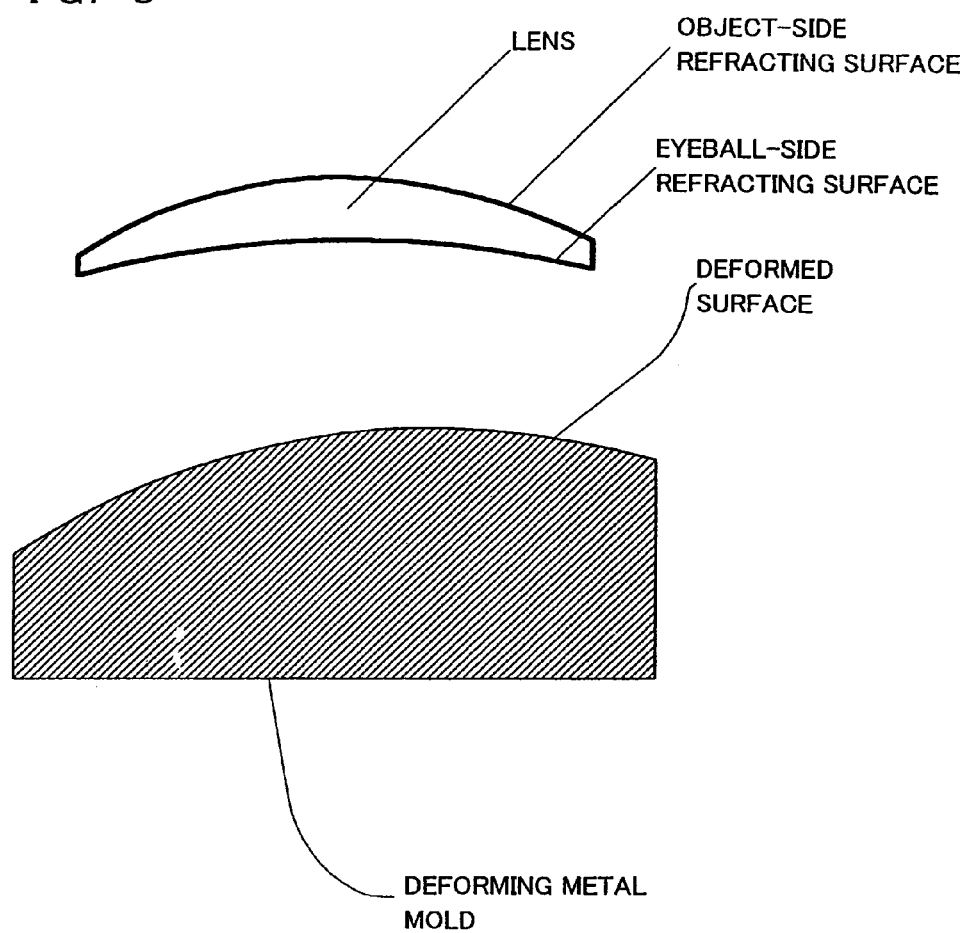
FIG. 3 is a conceptual diagram of a method for manufacturing the progressive power lens of the present invention.
Figure 4:
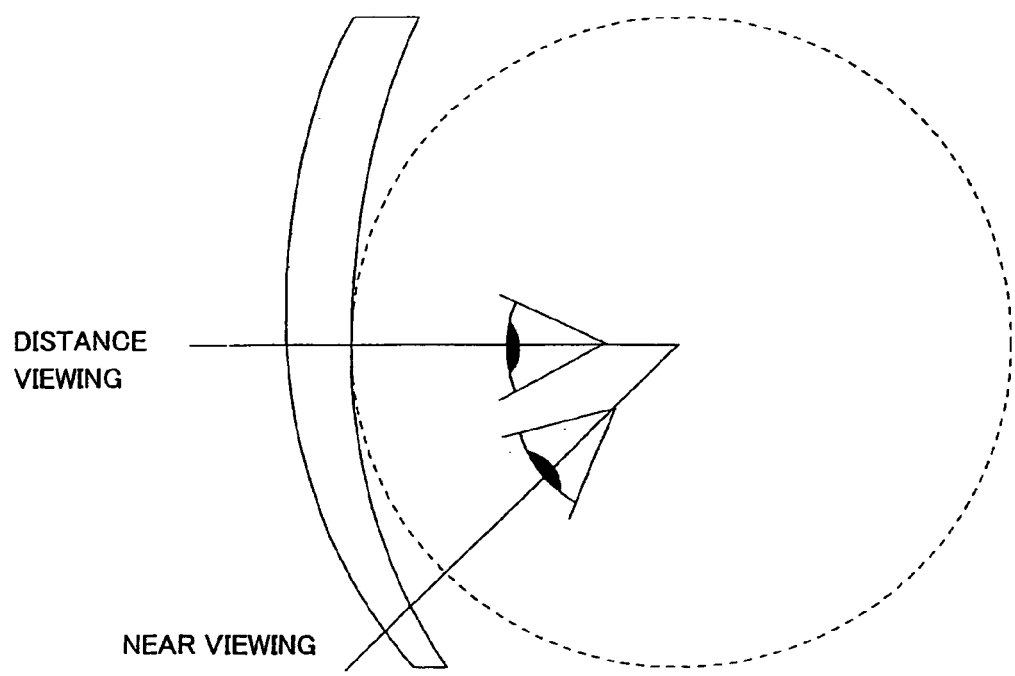
FIG. 4 is a conceptual diagram of a conventional progressive power lens.
Figure 5:
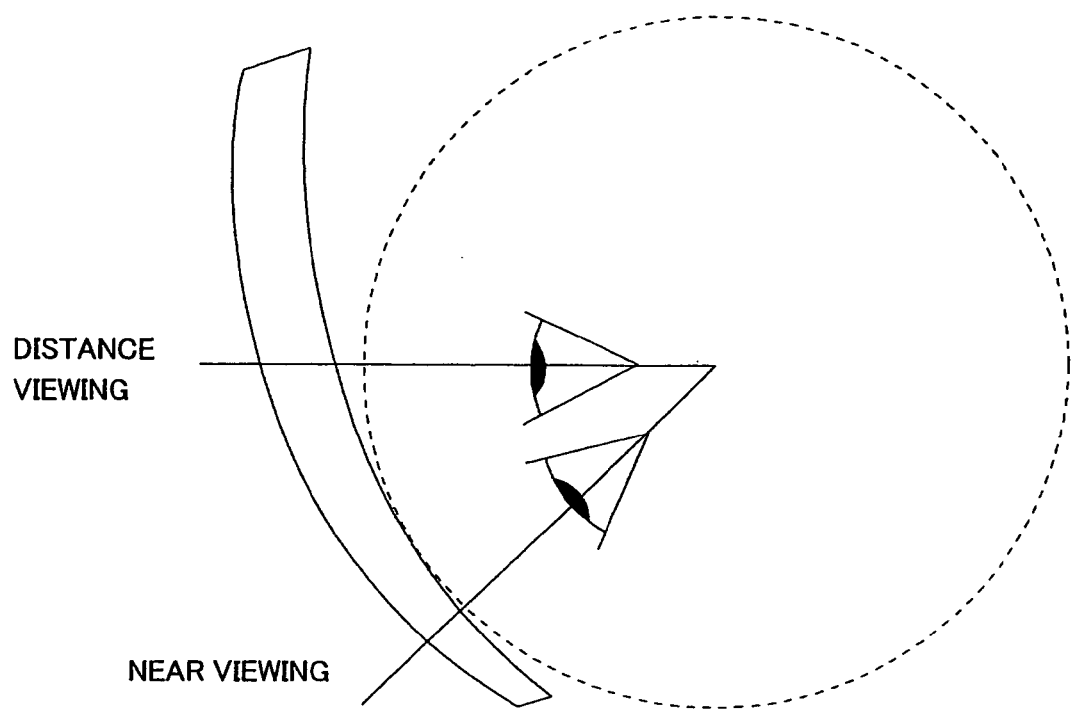
FIG. 5 is a conceptual diagram of the conventional progressive power lens.
Figure 6:
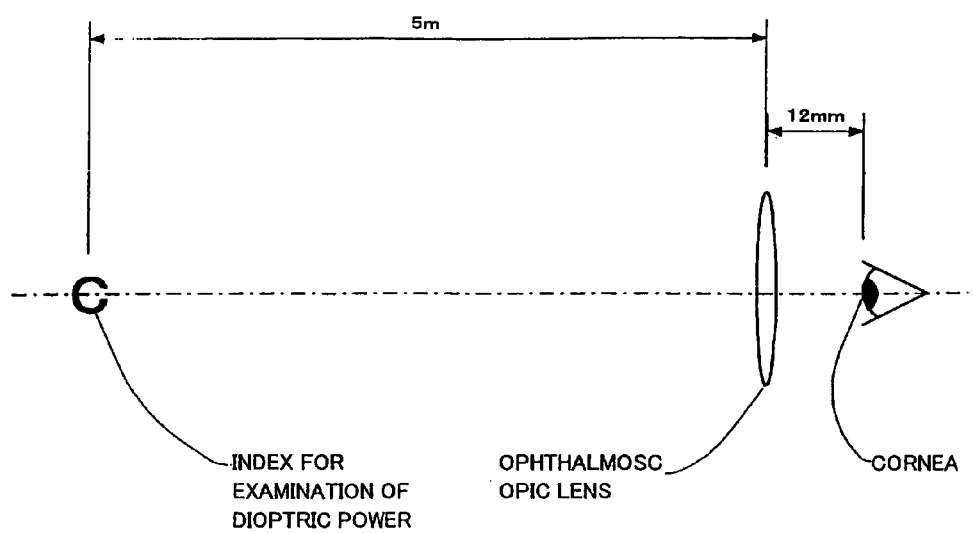
FIG. 6 is a conceptual diagram of an examination of dioptric power for distance viewing.
Figure 7:
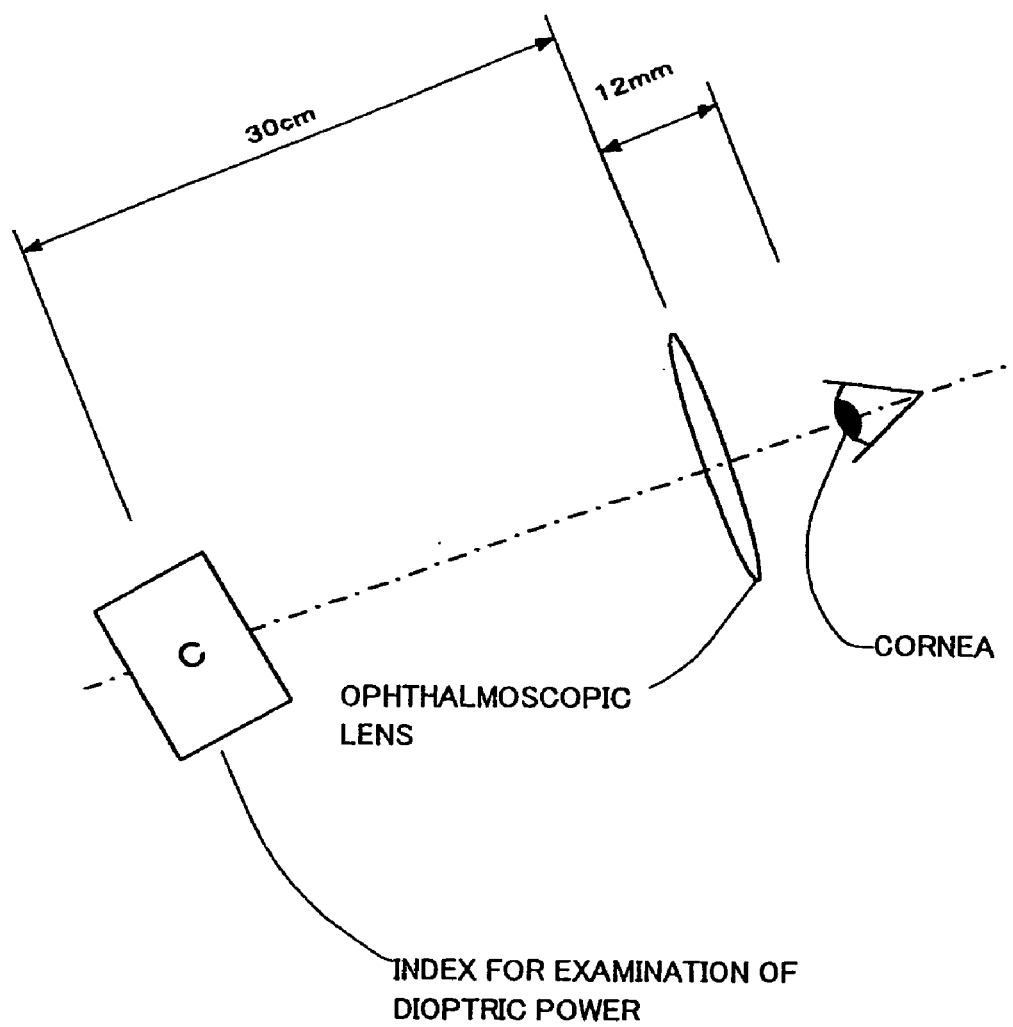
FIG. 7 is a conceptual diagram of an examination of dioptric power for near viewing.
Figure 8:
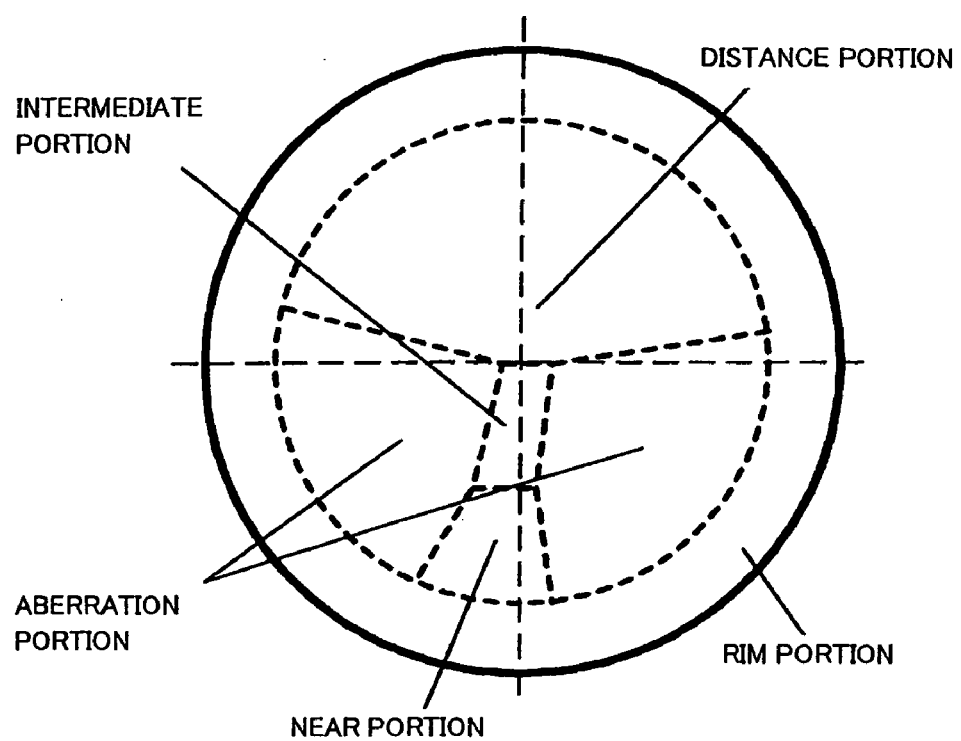
FIG. 8 is a conceptual diagram of a progressive power lens.
Figure 10:
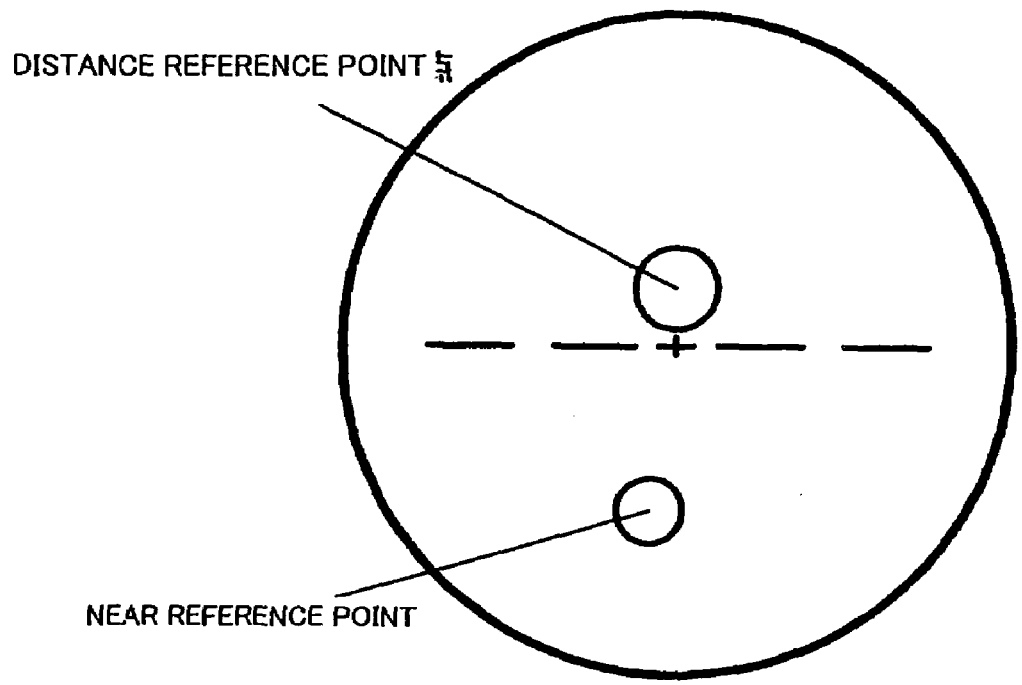
FIG. 10 is a layout diagram of a progressive power lens.
Figure 11:
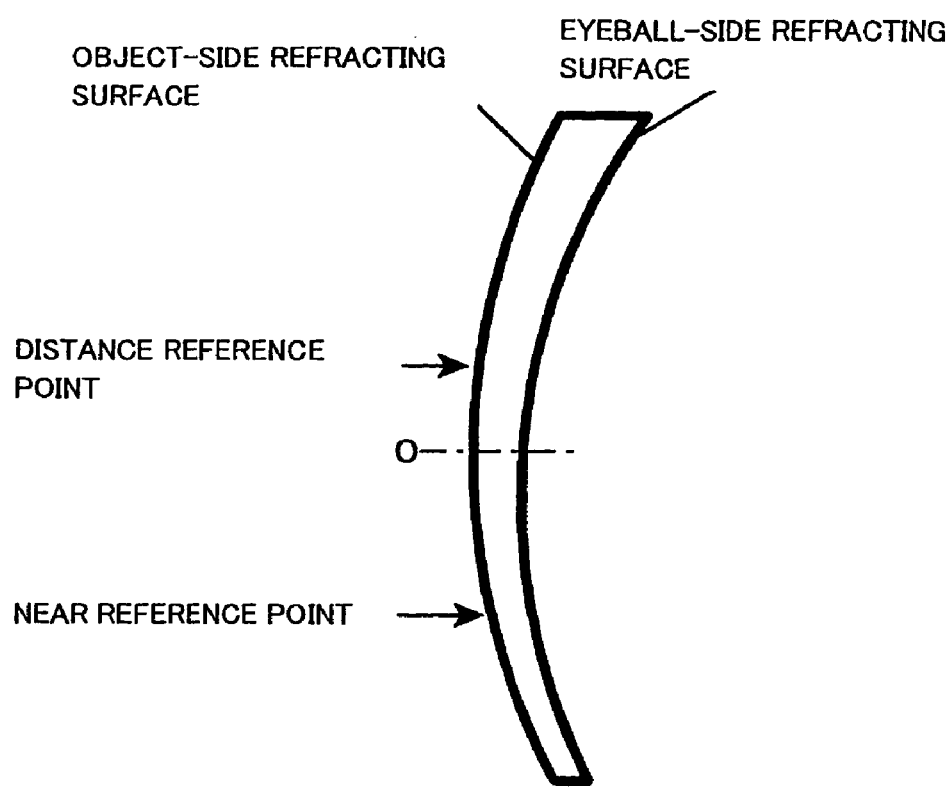
FIG. 11 is a conceptual diagram of an external progressive power lens.
Figure 12:
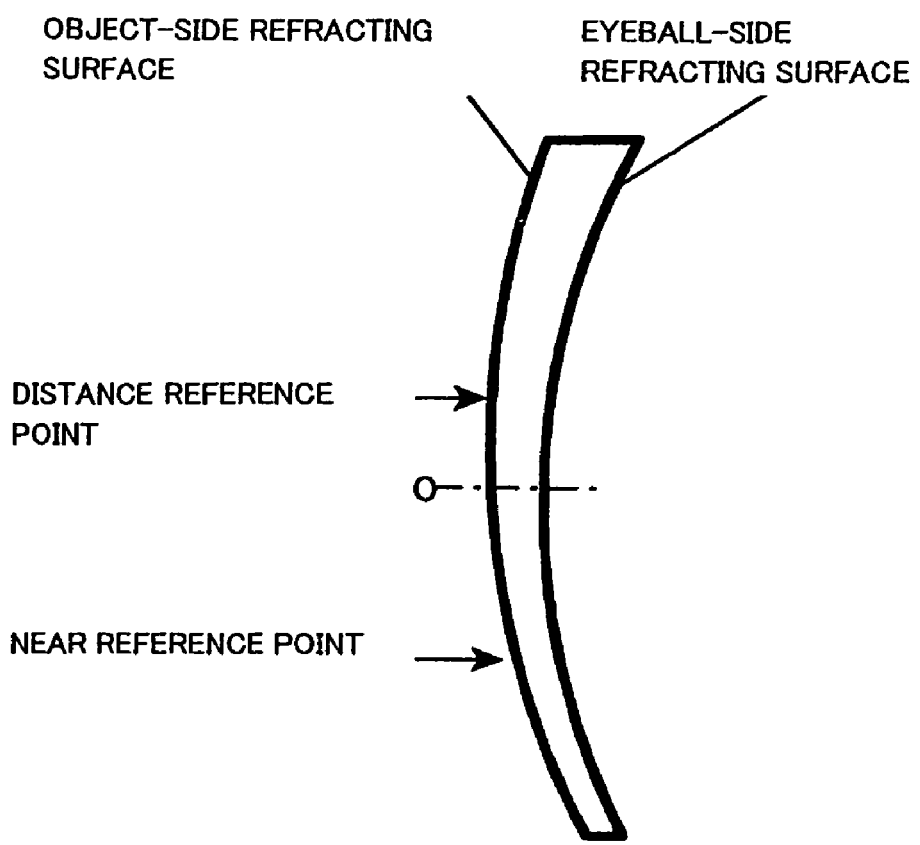
FIG. 12 is a conceptual diagram of an internal progressive power lens.

FIG. 1 shows a cross-section view of a lens in an embodiment of the present invention. In the drawing, a dotted line indicates a reference spherical surface derived by expanding, entirely over the lens, a spherical surface having an average curvature of an eyeball-side refracting surface in the vicinity of a distance reference point. The eyeball-side refracting surface of a progressive power lens of the present invention is characterized as displacing in such a manner as to come closer to an eyeball than the reference spherical surface. With such a structure, when the lens is used for glasses as shown in FIG. 2, even if framing is so done as to direct the optical axis in a distance portion in almost the same direction as the line of sight, an ear portion comes closer to the eyeball side compared with a conventional progressive power lens. Thanks thereto, provided is better field of view for near viewing. Further, the normal of the eyeball-side refracting surface of the near portion is directed closer to the eyeball than the conventional progressive power lens. Thus, the line of sight for near viewing is directed in an almost vertical direction due to the eyeball-side refracting surface, favorably preventing any possible influences such as aberration and others. This means, with mathematical definition, an absolute value of a vertical component of a normal vector of the eyeball-side refracting surface at the near reference point is larger than an absolute value of a vertical component of a normal vector of the reference spherical surface at the near reference point. As is known from FIG. 1, to make the eyeball-side refracting surface come closer to the eyeball than the reference spherical surface in the progressive power lens of the present invention, the curvature along the eyeball-side refracting surface is set larger than the curvature of the reference spherical surface somewhere between the distance reference point to the near reference point. FIG. 3 shows a method for manufacturing the progressive power lens of the present invention with a simple procedure. In the progressive power lens of the present invention, the eyeball-side refracting surface and the object-side refracting surface both have complex free-form surfaces. Here, with the current technologies, using expensive cutting/polishing machines will allow to process those two surfaces with a predetermined prescription. If this is the case, however, the processing time takes longer, and resulting in higher manufacturing cost. The method of. FIG. 3 is a manufacturing method at a lower cost. The lens of FIG. 3 is a progressive power lens of a conventional general type. The object-side refracting surface is a progressive surface in which a successive change is observed for surface power from the distance portion to the near portion, and the eyeball-side refracting surface is a spherical surface. The upper surface of a deforming metal mold is a deformed surface in the shape of the eyeball-side refracting surface of the progressive power lens of the present invention. When this deformed surface is placed relative to the eyeball-side refracting surface of the lens for heating, the eyeball-side refracting surface can be changed in shape along the displaced surface. If this is the case, the object-side refracting surface is also displaced by the same displacement amount as the eyeball-side refracting surface. Accordingly, this deforms the lens without changing the thickness at the respective points of the lens. In the resulting lens, irrespective of the different shape from the original shape, it is known that the part around the center of the lens can keep almost the same optical properties as the original lens. In such a manner, the progressive power lens of the present invention can be manufactured in the same method as an external progressive power lens whose object-side refracting surface is a progressive surface, and an internal progressive power lens whose eyeball-side refracting surface is a progressive surface. Moreover, in a case where a pair of right and left glasses have each different prescribed dioptric power, with the conventional progressive power lens, the distance from an eyeball to a near portion varies between right and left, causing the image magnification to be considerably different between right and left. As a result, this has been seriously affecting object viewing. With the progressive power lens of the present invention, on the other hand, without affecting the optical properties, the eyeball-side refracting surface can be in the same shape for both the right and left lenses. Accordingly, the distance from the eyeball to the near portion can be equalized between the right and left lenses, favorably providing glasses comfortable to wear.

With the progressive power lens of the present invention, compared with the conventional progressive power lens, the near portion can be closer to the eyeball at the time of framing, and thus any problems such as image distortion and fluctuation unique to the progressive power lens can be reduced to a considerable degree. Moreover, the eyeball-side refracting surface can be in the same shape without affecting the optical properties of the lens, and prevention measures can be successfully taken against any difference between right and left at the time of object viewing, and any difference at the time of object viewing due to the varying dioptric power. What is more, any type of the progressive power lens can be used as the progressive power lens of the present invention without impairing the optical properties only-by changing, in shape, a progressive power lens whose eyeball-side refracting surface is a spherical surface, a toroidal surface, an aspherical surface symmetric to a rotation axis, or a progressive surface, or a progressive power lens whose object-side refracting surface is a spherical surface, an aspherical surface symmetrical to a rotation axis, or a progressive surface.

The invention claimed is:

1. A progressive power lens that is structured by two refracting surfaces of an object-side refracting surface and an eyeball-side refracting surface, comprising: a distance portion mainly for viewing objects in a distance range; a near portion mainly for viewing objects in a close range; and an intermediate portion mainly for viewing objects in an intermediate range in which a successive change is observed for power from the distance portion to the near portion, and a distance reference point is set to the distance portion and a near reference point is set to the near portion, characterized in that when the lens is presumably a reference spherical surface in its entirety that is defined by an average curvature of the eyeball-side refracting surface in a vicinity of the distance reference point, the eyeball-side refracting surface in a vicinity of the near reference point is located closer to an eyeball side than the reference spherical surface in a vicinity of the near reference point, wherein the eyeball-side refracting surface is a progressive surface.

2. A progressive power lens structured by two refracting surfaces of an object-side refracting surface and an eyeball-side refracting surface, comprising: a distance portion mainly for viewing objects in a distance range; a near portion mainly for viewing objects in a close range; and an intermediate portion mainly for viewing objects in an intermediate range in which a successive change is observed for power from the distance portion to the near portion, and a distance reference point is set to the distance portion and a near reference point is set to the near portion, characterized in that a curvature along an intersection line defined by the eyeball-side refracting surface and a surface of section being vertical to the eyeball-side refracting surface and passing both the distance reference point and the near reference point shows an increase in a portion entirely covering the distance reference point and the near reference point, or a portion partially covering the same, wherein the eyeball-side refracting surface is a progressive surface.

3. A progressive power lens structured by two refracting surfaces of an object-side refracting surface and an eyeball-side refracting surface, comprising: a distance portion mainly for viewing objects in a distance range; a near portion mainly for viewing objects in a close range; and an intermediate portion mainly for viewing objects in an intermediate range in which a successive change is observed for power from the distance portion to the near portion, and a distance reference point is set to the distance portion and a near reference point is set to the near portion, characterized in that when the lens has presumably a reference spherical surface in its entirety that is defined by an average curvature of the eyeball-side refracting surface in the vicinity of the distance reference point, an absolute value of a vertical component of a normal vector of the eyeball-side refracting surface at the near reference point is larger than an absolute value of a vertical component of a normal vector of the reference spherical surface at the near reference point,
wherein the eyeball-side refracting surface is a progressive surface.

4. A progressive power lens that is structured by two refracting surfaces of an object-side refracting surface and an eyeball-side refracting surface, comprising: a distance portion mainly for viewing objects in a distance range; a near portion mainly for viewing objects in a close range; and an intermediate portion mainly for viewing objects in an intermediate range in which a successive change is observed for power from the distance portion to the near portion, and a distance reference point is set to the distance portion and a near reference point is set to the near portion, characterized in that when the lens is presumably a reference spherical surface in its entirety that is defined by an average curvature of the eyeball-side refracting surface in a vicinity of the distance reference point, the eyeball-side refracting surface in a vicinity of the near reference point is located closer to an eyeball side than the reference spherical surface in a vicinity of the near reference point, characterized in that in a pair of right and left lenses, the eyeball-side refracting surface has the same shape even if the power and addition power vary between right and left distance portions.

5. The progressive power lens according to any one of claims 1, 2 and 3, wherein the eyeball-side refracting surface is a spherical surface, a toroidal surface, or an aspherical surface symmetric to a rotation axis.

6. The progressive power lens according to any one of claims 1, 2 and 3, wherein the object-side refracting surface is a spherical surface, an aspherical surface symmetrical to a rotation axis, or a progressive surface is deformed in lens shape without changing a thickness.

7. The progressive power lens according to claim 1, wherein the progressive surface is deformed in lens shape without changing a thickness of the lens.

8. The progressive power lens according to claim 2, wherein the progressive surface is deformed in lens shape without changing a thickness of the lens.

9. The progressive power lens according to claim 3, wherein the progressive surface is deformed in lens shape without changing a thickness of the lens.

10. A lens, comprising:
an eye side refracting surface;
an object side refracting surface; and
a lens portion between the eye side refracting surface and object side refracting surface, wherein the lens portion comprises:
a distance viewing portion
a near viewing portion, and
an intermediate viewing portion between the distance viewing portion and near viewing portion,
wherein the eye side refracting surface corresponding to the near portion lies inside a substantially spherical reference surface lying equidistant from an eye and the eye side refracting surface of the distance portion is substantially aligned with said substantially spherical reference surface,
wherein the eye-side refracting surface is a progressive surface.

11. The progressive power lens according to claim 10, wherein a substantially spherical curvature of the distance viewing portion and the near viewing portion is substantially the same as the substantially spherical reference surface and where a curvature of the intermediate portion is greater than a curvature of the substantially spherical reference surface.

12. The progressive power lens according to claim 10, wherein the intermediate viewing portion between the distant viewing portion and the near viewing portion has a refractive power varying between a refractive power of the distant viewing portion and the near viewing portion so as to provide a smooth refractive power transition between the distant viewing portion and the near viewing portion.

13. The lens according to claim 10, wherein the progressive surface is deformed in lens shape without changing a thickness of the lens.

14. A progressive power lens structured by two refracting surfaces of an object-side refracting surface and an eyeball-side refracting surface, comprising: a distance portion mainly for viewing objects in a distance range; a near portion mainly for viewing objects in a close range; and an intermediate portion mainly for viewing objects in an intermediate range in which a successive change is observed for power from the distance portion to the near portion, and a distance reference point is set to the distance portion and a near reference point is set to the near portion, characterized in that a curvature along an intersection line defined by the eyeball-side refracting surface and a surface of section being vertical to the eyeball-side refracting surface and passing both the distance reference point and the near reference point shows an increase in a portion entirely covering the distance reference point and the near reference point, or a portion partially covering the same, characterized in that in a pair of right and left lenses, the eyeball-side refracting surface has the same shape even if the power and addition power vary between right and left distance portions.

15. A progressive power lens structured by two refracting surfaces of an object-side refracting surface and an eyeball-side refracting surface, comprising: a distance portion mainly for viewing objects in a distance range; a near portion mainly for viewing objects in a close range; and an intermediate portion mainly for viewing objects in an intermediate range in which a successive change is observed for power from the distance portion to the near portion, and a distance reference point is set to the distance portion and a near reference point is set to the near portion, characterized in that when the lens has presumably a reference spherical surface in its entirety that is defined by an average curvature of the eyeball-side refracting surface in the vicinity of the distance reference point, an absolute value of a vertical component of a normal vector of the eyeball-side refracting surface at the near reference point is larger than an absolute value of a vertical component of a normal vector of the reference spherical surface at the near reference point, characterized in that in a pair of right and left lenses, the eyeball-side refracting surface has the same shape even if the power and addition power vary between right and left distance portions.

* * * * *